United States Patent
Fujita et al.

[11] Patent Number: 5,907,531
[45] Date of Patent: May 25, 1999

[54] READ-WRITE, READ-ONLY MEDIUM AUTOMATIC INTERCHANGE APPARATUS AND MAGAZINE WITH TRAY MEDIUM DISCRIMINATING MEANS

[75] Inventors: Makoto Fujita, Ikomashi; Yasuhisa Fukushima, Hirakatashi, both of Japan

[73] Assignee: Matsushita Electric Industrial Co., Ltd., Japan

[21] Appl. No.: 08/787,351

[22] Filed: Jan. 22, 1997

[51] Int. Cl.⁶ .................................................. G11B 17/04
[52] U.S. Cl. .......................................................... 369/178
[58] Field of Search .............................. 369/178, 36, 34; 360/98.06

[56] References Cited

U.S. PATENT DOCUMENTS

| | | | |
|---|---|---|---|
| 4,800,554 | 1/1989 | Yamasaki et al. | 360/98.06 |
| 4,819,114 | 4/1989 | Bernitt et al. | 360/133 |
| 5,253,246 | 10/1993 | Leonhardt et al. | 369/36 |
| 5,357,495 | 10/1994 | Solhjell | 369/34 |
| 5,548,571 | 8/1996 | Mistretta | 369/77.2 |
| 5,638,347 | 6/1997 | Baca et al. | 369/178 |

FOREIGN PATENT DOCUMENTS

| | | | |
|---|---|---|---|
| 0 453 064 A2 | 10/1991 | European Pat. Off. | 369/178 |
| 61-206978 | 9/1986 | Japan. | |
| 2-118958 | 5/1990 | Japan. | |
| 5-4130 | 2/1993 | Japan. | |
| 94/22140 | 9/1994 | WIPO | 369/178 |

*Primary Examiner*—Allen T. Cao
*Attorney, Agent, or Firm*—Parkhurst & Wendel, L.L.P.

[57] ABSTRACT

Trays for reproduction-only media and trays for recordable and reproducible media are individually fixed in a single magazine and the recordable and reproducible media are protected by making ejection difficult, thereby providing an auto-changer and a magazine for dual-purpose use or mixing of the reproduction-only media and the recordable and reproducible media. A tray (27a) and a tray (27b) stored in a magazine (21) are fixed to the magazine (21) by respective locking member. A magazine holder (53) of the auto-changer is provided with a release lever (49) and a release layer (50) which are assisted by a release spring (51) and a release spring (52), respectively When the magazine (21) is inserted into the magazine holder (53), the locking member (47) and the locking member (48) are pushed by the release levers, respectively, whereby the lock of the trays (27a) and (27b) in the magazine (21) is released, and the trays (27a) and (27b) can be freely taken out of the magazine (21).

2 Claims, 7 Drawing Sheets

diagram viewed from M direction

FIG.3 (B)

diagram viewed from M direction

FIG.8　　　　　　　　　　　　　　PRIOR ART

READ-WRITE, READ-ONLY MEDIUM AUTOMATIC INTERCHANGE APPARATUS AND MAGAZINE WITH TRAY MEDIUM DISCRIMINATING MEANS

FIELD OF THE INVENTION

The present invention relates to a medium automatic interchange apparatus that can selectively interchange plural optical disk media in which reproduction-only media, such as CD-ROMs, and recordable and reproducible optical disk media are mixed, and to a magazine as means for storing the media.

BACKGROUND OF THE INVENTION

Recently, with an increase in storage capacity and an increase in data recording/reproducing speed, optical disk media have attracted a lot of attention not only as external memories for computers but also as media for image processing, and medium automatic interchange apparatus (hereinafter referred to as auto-changers) capable of managing and processing mass data have been marketed Besides, in recent years, a small-sized auto-changer has been demanded in view of its installation space, and an auto-changer that stores plural media disposed on trays to improve storage efficiency as well as handling simplicity has been proposed.

Hereinafter, a conventional magazine system auto-changer will be described with reference to FIGS. 7 and 8.

Figure 7:
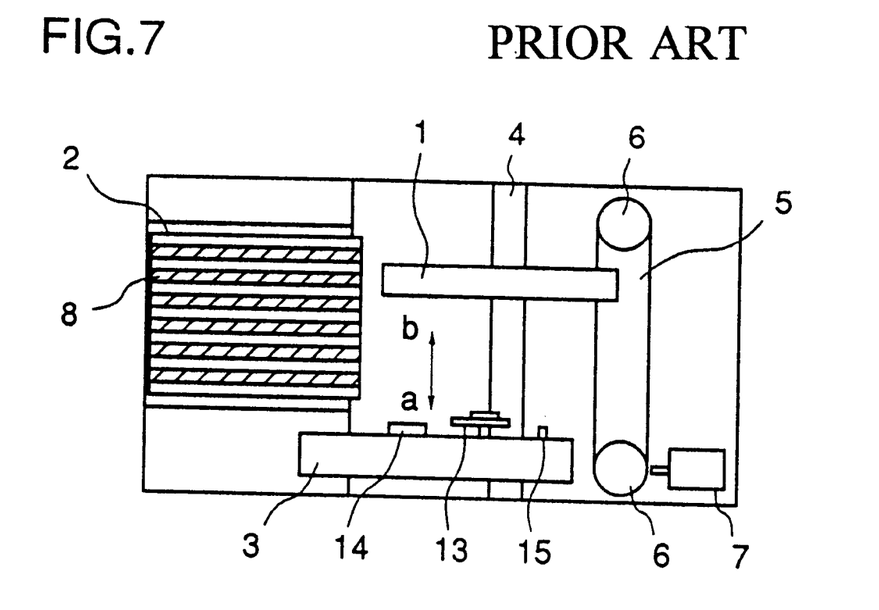
FIG. 7 is a diagram illustrating a conventional example of an auto-changer.
Figure 8:
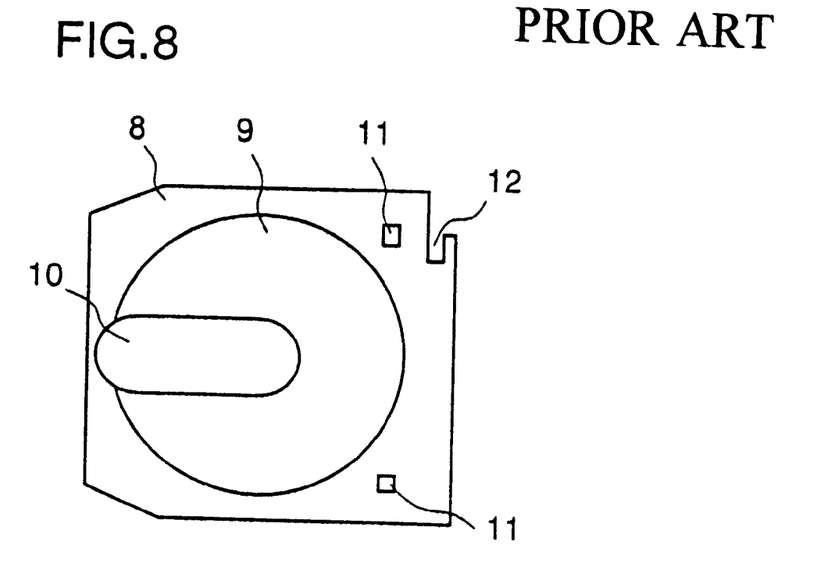
FIG. 8 is a diagram illustrating a conventional example of a tray for a medium.

FIG. 7 shows a conventional auto-changer. Reference numeral 1 designates a tray carrier unit that takes a tray 8, on which a medium (not shown) is disposed, from a magazine 2, and moves in the arrow a direction to send the tray onto a drive 3. The tray carrier unit 1 is guided by a guide shaft 4 and driven by a motor 7 through a pulley 6 and a belt 5. As seen from FIG. 8, the tray 8 is provided with a medium storage recess 9, an opening 10 in which a pickup 14 and a turn table 13 on the drive 3 can enter, positioning holes 11 for positioning of the tray relative to the drive 3, and a notch 12 by which the tray carrier unit 1 performs ejection/insertion of the tray from/in the magazine 2. Further, the drive 3 installed on the auto-changer is provided with a turn table 13 that rotates with a medium disposed on it, a pickup 14 that reads signals from the medium, and positioning pins 15 corresponding to the positioning holes 11 of the tray 8.

Next, the operation will be described. The tray carrier unit 1 is driven by the drive motor 7 through the belt 5 in the arrow a and b directions, moves to a position corresponding to a specified tray 8, and takes the tray 8 from the magazine 2 using the notch 12. Next, the tray carrier unit 1 having the tray 8 moves in the arrow a direction and performs positioning of the tray 8 relative to the drive 3 by fitting the positioning holes 11 of the tray 8 to the positioning pins 15 on the drive 3. At this time, the turn table 13 and the pickup 14 on the drive 3 enter in the opening 10 of the tray 8, centering of the medium disposed on the tray 8 is performed on the turn table 13, and the medium is fixed onto the turn table 13 by clamping means (not shown) constructed on the tray carrier unit 1. Thereafter, the turn table 13 rotates, and reading of signals is carried out by the pickup 14. In this state, the tray 8 is positioned by the drive 3 and held in the tray carrier unit 1 at such a height that it does not contact the medium.

The operation to return the tray 8 for which reproduction has ended will be performed as follows. When the turn table 13 stops, the tray carrier unit 1, which has been positioned by the drive 3, is moved in the arrow b direction by the drive motor 7. Thereby, clamping of the medium onto the turn table 13 is canceled, and the medium being disposed on the tray 8 is sent to a prescribed position of the magazine 2 and returned into the magazine 2 using the notch 12.

In the conventional structure mentioned above, however, the tray is not provided with means for detecting the kind of the medium, and the installed drive is either a drive for reproduction only or a drive for both recording and reproduction. Hence, it can deal with only one of a medium for reproduction-only and a medium for both recording and reproduction and, therefore, it is not applicable to an auto-changer using a mixture of reproduction-only media, such as CD-ROMs, and recordable and reproducible optical disk media, which media perform such as image processing that has attracted attention in recent years. Further, in an auto-changer using a single magazine, since recordable and reproducible optical disk media are sensitive to finger prints and flaws in handling, they cannot be used in a mixture in a magazine which is changeable freely by the user.

SUMMARY OF THE INVENTION

The present invention is directed to solving the above-mentioned problems and has for its object to provide an auto-changer that can use reproduction-only media, such as CD-ROMs, and recordable and reproducible optical disk media, which are mixed in a single magazine, and a magazine for these media.

To attain the object mentioned above, in the present invention, an auto-changer is equipped with a recording and reproducing apparatus that can handle any of reproduction-only media, such as CD-ROMs, and recordable and reproducible media; trays for media, each tray having medium discriminating means for setting the kind of a medium disposed on it, at a position corresponding to medium discriminating means of the recording and reproducing apparatus; and a magazine provided with individual locking means corresponding to the two kinds of media trays. Further, the tray on which a recordable and reproducible medium is disposed is provided with means for arbitrarily setting 'enable' or 'disable' for recording of the medium, and the user can easily set this from the outside of the magazine in which the tray is stored.

This structure provides an auto-changer that can selectively use plural reproduction-only media, such as CD-ROMs, and plural recordable and reproducible media within a single magazine, and realizes an auto-changer system with improved operability, in which enable/disable setting for recording/deletion of the recordable and reproducible medium can be performed without taking the tray from the magazine.

DETAILED DESCRIPTION OF THE PREFERRED EMBODIMENTS

Hereinafter, a first embodiment of the present invention will be described with reference to FIGS. 1A, 1B, 2A, 2B, 3A, 3B, 4, and 5.

Figure 1:
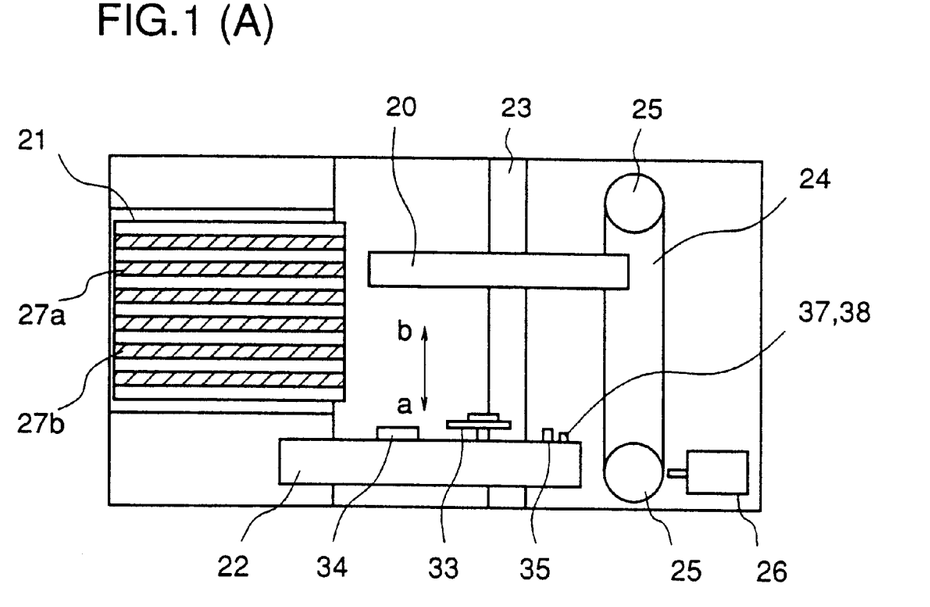
FIG. 1(A) is a diagram illustrating a first embodiment of an auto-changer according to the present invention.
FIG. 1(B) is a plan view of a drive installed on the first embodiment of the auto-changer according to the present invention.
Figure 2:
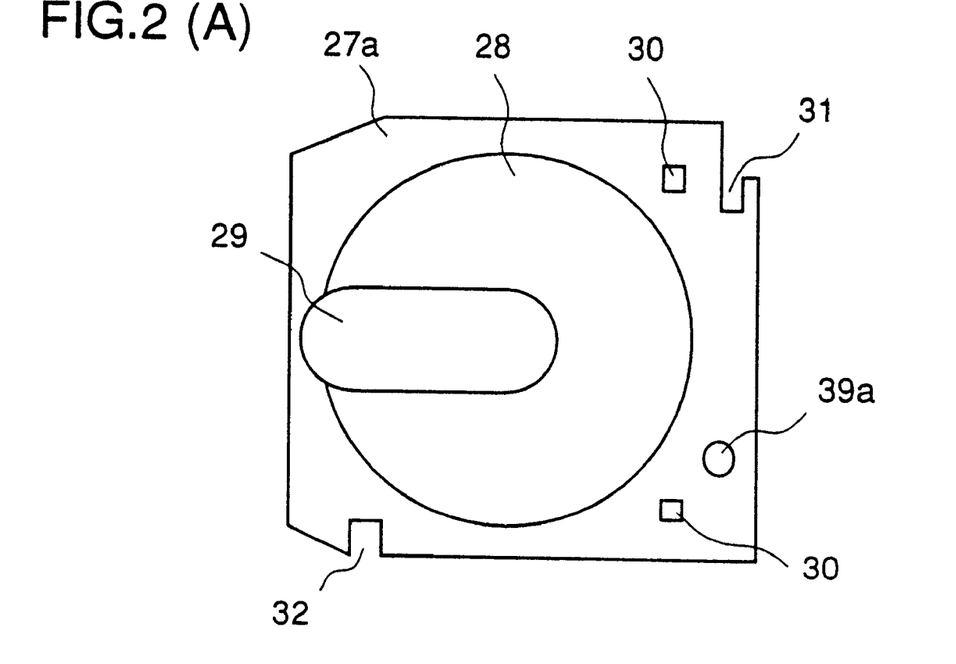
FIG. 2(A) is a plan view of a tray for a medium for reproduction only according to the present invention.
FIG. 2(B) is a plan view of a tray for a recordable and reproducible medium according to the present invention.
Figure 3:
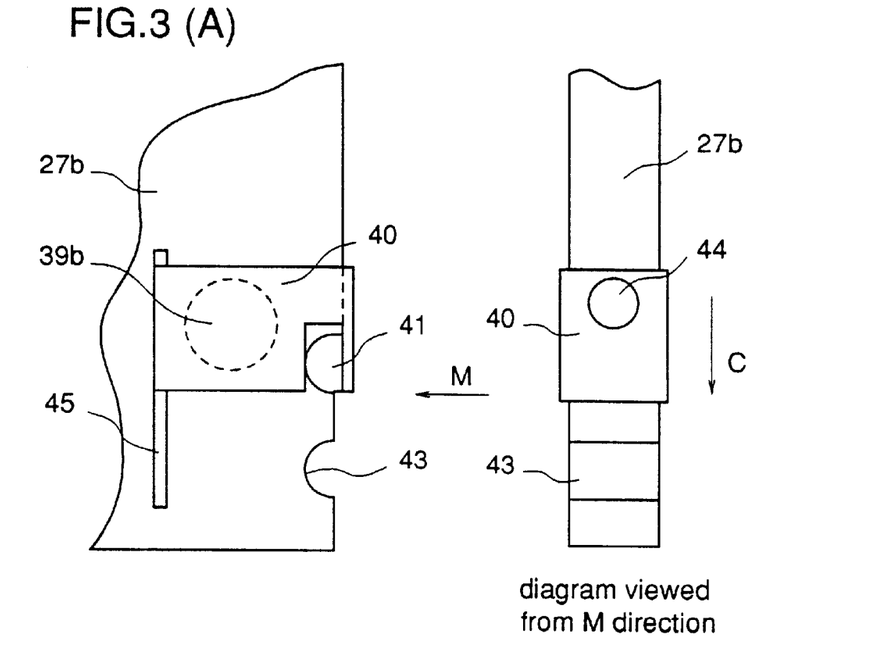
FIGS. 3(A) and 3(B) are enlarged views of portions of the tray for a recordable and reproducible medium.

FIG. 1 shows a first embodiment of an auto-changer according to the present invention. In FIG. 1, reference numeral 20 designates a tray carrier unit that takes a first tray 27a and a second tray 27b, on which media (not shown) are disposed, from a magazine 21, and moves in the arrow a direction to send these trays onto a drive 22. The tray carrier unit is guided by a guide shaft 23 and driven by a drive motor 26 through a pulley 25 and a belt 24. The tray 27a shown in FIG. 2A is used for a reproduction-only medium, and has a medium storing recess 28. Further, it is provided with an opening 29 into which a pickup 34 and a turn table 33 on the drive 22 can enter, positioning holes 30 for performing positioning of the medium relative to the drive 22, a first sensor hole 39a showing the use for a reproduction-only medium, which hole is set at a position corresponding to a first switch 37 provided on the drive 22, a notch 31 by which the tray carrier unit 20 performs ejection/insertion of the tray from/in the magazine 21, and a lock groove 32 for locking the tray in the magazine 21. FIG. 2B shows a tray for a recordable and reproducible medium, and FIGS. 3A and 3B are enlarged views of portions thereof. Next, the tray for a recordable and reproducible medium will be explained using these figures. The same parts as those described for the tray for a reproduction-only medium are denoted by the same reference numerals, and description for these parts will be omitted.

On the second tray 27b, a second sensor hole 39b is set at a position corresponding to a second switch 38 for detecting 'enable' or 'disable' of recording/deletion of the drive 22, and a slider 40 covers the second sensor hole 39b. This slider 40 is slidably guided by a guide groove 45 of the tray 27b and, when a locking claw 41, which is usually united with the slider 40, is fitted in a first notch 42 of the second tray 27b, the slider 40 covers the second sensor hole 39b, and the recordable and reproducible medium is in its recording/deletion enable state. When the user makes the recordable and reproducible medium disposed on the second tray 27b be in its recording/deletion disable state, the following operation is performed.

Using an operating hole 44 on the side of the slider 40, the slider 40 is moved in the arrow c direction shown in FIG. 3A, against the holding power between the locking claw 41 and the first notch 42, to a position at which the locking claw 41 is fitted in a second notch 43. In this state, the second sensor hole 39b is exposed at the surface of the second tray 27b, so that it can be detected by the second switch 38 of the drive 22, whereby it is recognized that recording/deletion of this medium are impossible. Of course, it is needless to say that the relationship between the second sensor hole 39b and the second switch 38 for detection is possible even though they are inversely provided to the state mentioned above.

Furthermore, the drive 22 mounted on the auto-changer shown in FIG. 1A is equipped with a turn table 33 that rotates with a medium on it; a pickup 34 that is guided by a pickup guide 36, is driven by such as a linear motor in the radial direction of the medium, and reads signals from the medium; positioning pins 35 corresponding to the positioning holes 30 of the trays 27a and 27b; a first switch 37 for detecting whether the medium is a reproduction-only medium or a recordable and reproducible medium; and a second switch 38 for detecting 'enable' or 'disable' of recording/deletion in case of a recordable and reproducible medium.

A description is given of the operation.

The tray carrier unit 20 is driven by the drive motor 26 through the belt 24 in the arrow a and b directions, moves to a position corresponding to the specified first tray 27a, and takes the tray 27a, on which a medium is disposed in the medium storing recess 28, from the magazine 21 using the notch 31. Next, the tray carrier unit 20 having the tray 27a moves in the arrow a direction, and the positioning holes 30 of the tray 27a are fitted to the positioning pins 35 of the drive 22, whereby positioning of the tray 27a relative to the drive 22 is performed. At this time, the turn table 33 and the pickup 34 on the drive 22 enter into the opening 29, centering of the medium disposed on the tray 27a is performed on the turn table 33, and the medium is fixed onto the turn table 33 using clamping means (not shown) of the tray carrier unit 20. Simultaneously with this operation, the first switch 37 detects the first sensor hole 39a set on the tray 27a and recognizes that the medium disposed on the drive 22 is a reproduction-only medium, such as a CD-ROM, and switching to rotation (for example, CLV) and circuit corresponding to the medium is performed, followed by reading of signals by the pickup 34. In this state, the tray 27a is positioned by the drive 22 and held in the tray carrier unit 20 at such a height that it does not contact the medium.

The operation to return the tray 27a for which reproduction has ended is performed as follows. When the turn table 33 stops, the tray carrier 20, which has been positioned by the drive 22, is moved in the arrow b direction by the drive motor 26, and clamping of the medium onto the turn table 33 is canceled. Then, the tray 27a, on which the medium is disposed in the medium storing recess 28, is moved to a prescribed position of the magazine 21 and returned into the magazine 21 using the notch 31. The operation in the auto-changer using the tray 27b for a recordable and reproducible medium is fundamentally identical to that of the tray 27a for a reproduction-only medium and, therefore, only a difference will be described hereinafter. In the state where the sensor hole 39b of the second tray 27b is covered with the slider 40, when the tray 27b is transferred above the drive 22, the second switch 38 judges that it is in the state where recording/deletion are possible, and ordinary recording/reproduction or deletion are performed. In the state where the second sensor hole 39b of the tray 27b is exposed at the surface, when the tray 27b is transferred above the drive 22, the second switch 38 judges that it is in the state where recording/deletion are impossible and, for example, the auto-changer sends an error message to the host, and the tray 27b is returned to its magazine 21.

Figure 4:
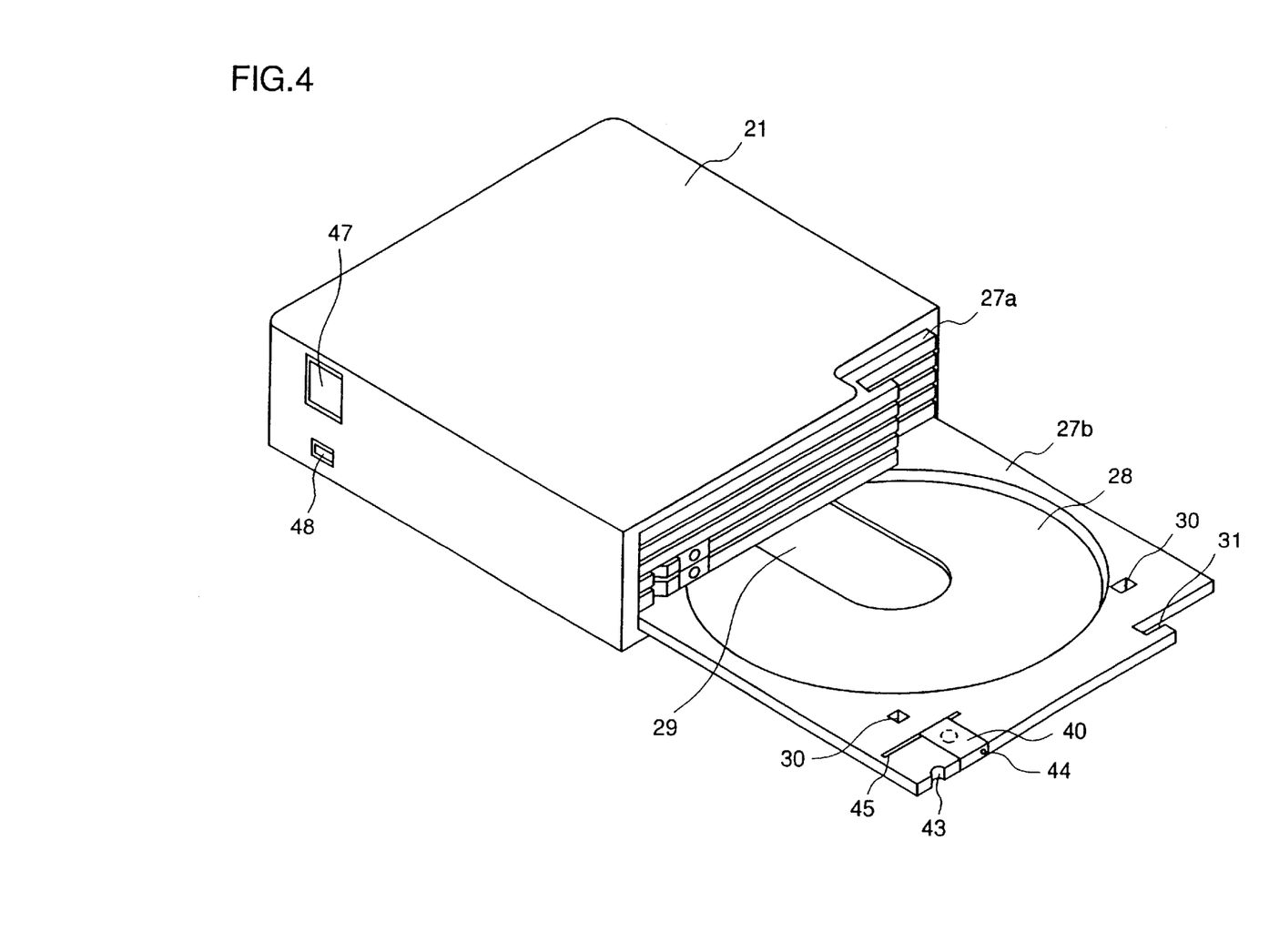
FIG. 4 is a diagram illustrating an embodiment of a magazine according to the present invention.

FIG. 4 shows an embodiment of a magazine that can store a mixture of first and second trays 27a and 27b which are explained above. The magazine 21 can store three first trays 27a and three second trays 27b, and it is provided with a first locking means 47 and a second locking means 48 used for the respective trays, which locking means fix the trays 27a and 27b into the magazine 21 by fitting end portions thereof in the locking grooves 32 of the trays 27a and 27b, respectively, whereby these trays are locked so as not to be taken out in the ordinary state. When the first locking means 47 and the second locking means 48 are pushed from the outside, the lock between the magazine and the tray is released. The first locking means 47 corresponding to the tray 27a has a large opening so that the user can easily push it from the outside to change the medium. Further, the second locking means 48 corresponds to the tray 27b for a recordable and reproducible medium and has a small opening so that the user cannot release the lock easily. In the magazine 21, the trays 27b are stored with the sliders 40 being arranged in a line at the front surface, so that the user can easily set 'enable' or 'disable' for recording/deletion of media, for each tray, by moving the slider 40 as mentioned above.

Figure 5:
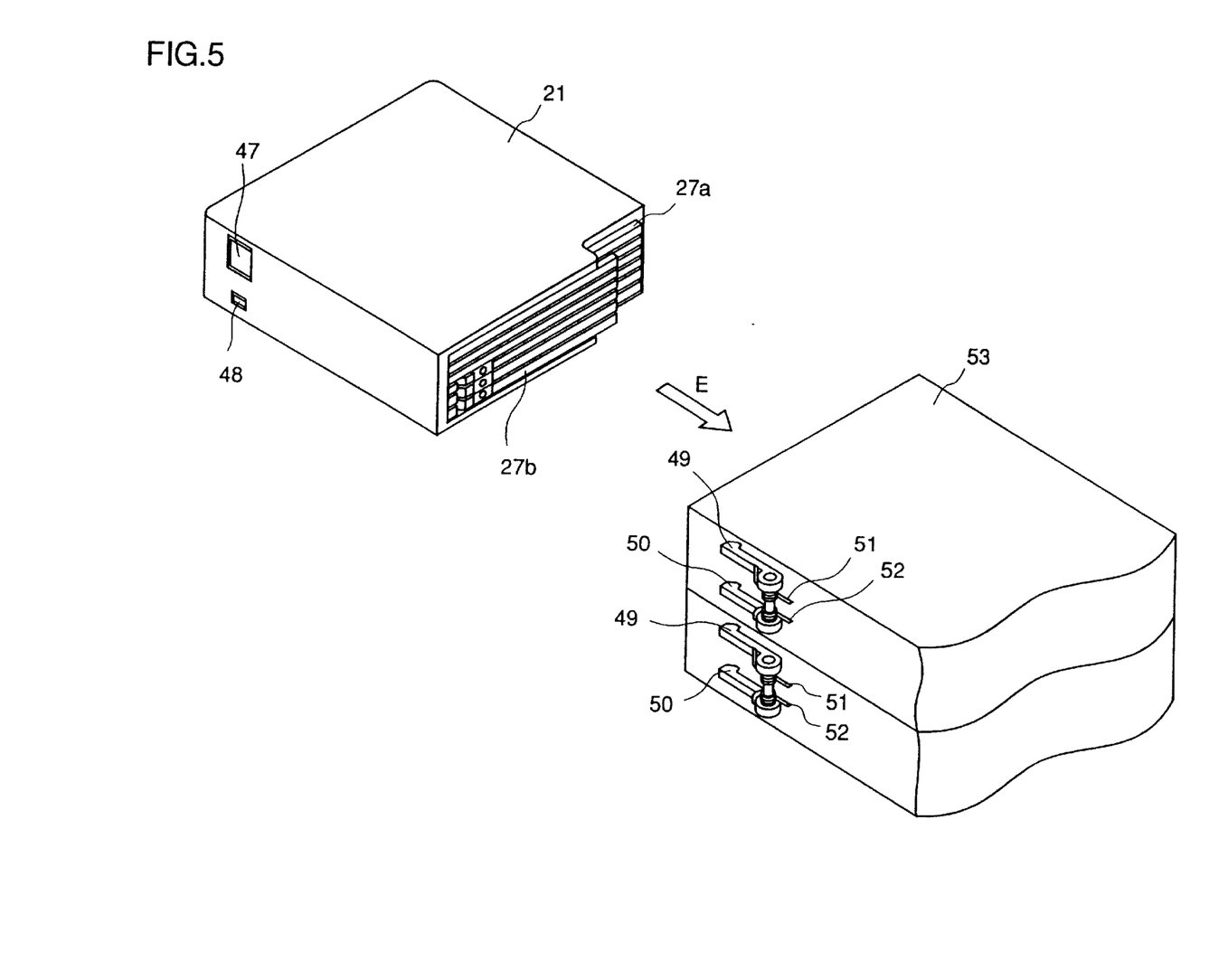
FIG. 5 is a diagram illustrating a structure of a lock releasing mechanism of the magazine.

FIG. 5 shows a mechanism for releasing the first locking means 47 and the second locking means 48 when the above-mentioned magazine 21 is mounted on the auto-changer. On the internal side surface of the magazine holder 53 of the auto-changer, first and second release levers 49 and 50 are provided at positions corresponding to the first and second locking means 47 and 48, respectively, and assisted by first and second release springs 51 and 52, respectively. When the magazine 21 is inserted in the magazine holder 53 as shown by arrow E, the first and second release levers 49 and 50 push the first and second locking means 47 and 48 with assisted forces of the first and second release springs 51 and 52, and release the lock of the first and second trays 27a and 27b in the magazine 21, thereby enabling the tray carrier unit to take out the trays.

Figure 6:
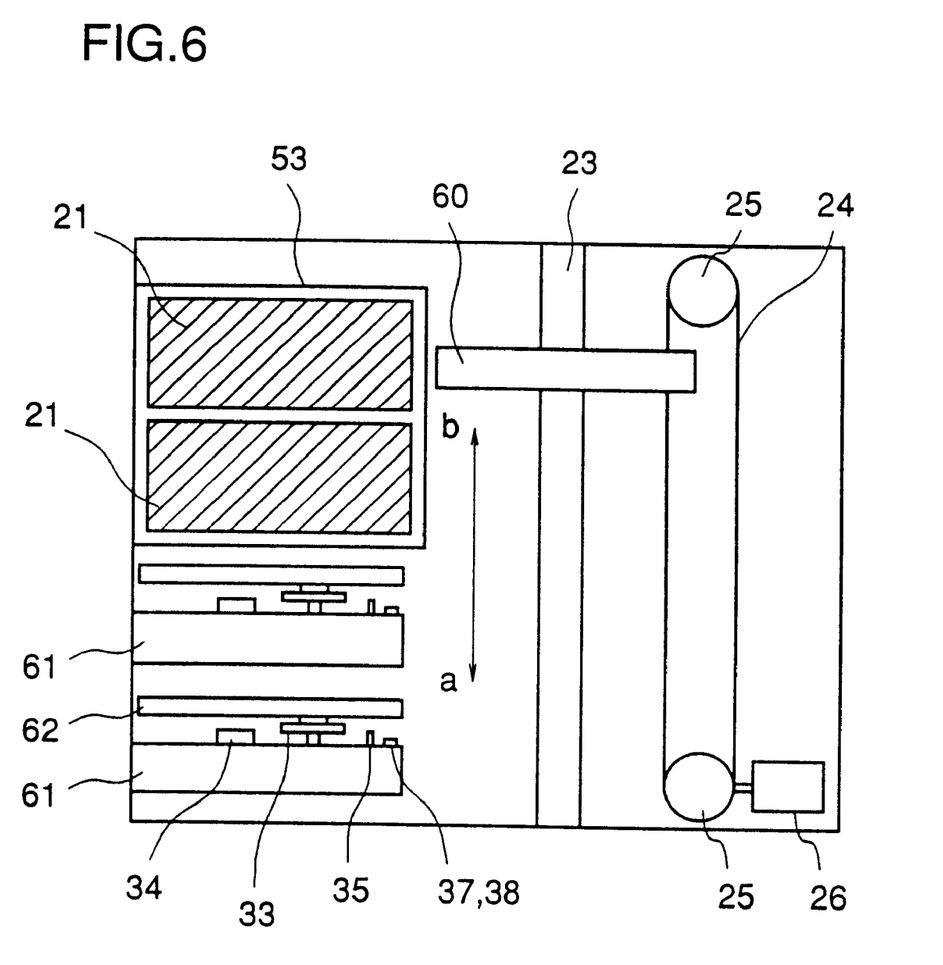
FIG. 6 is a diagram illustrating a second embodiment of an auto-changer according to the present invention.

FIG. 6 shows a second embodiment of an auto-changer using this magazine.

Reference numeral 21 designates a magazine in which trays are stored. The magazine is inserted in a magazine holder 53, and lock of the tray in the magazine is released. Reference numeral 61 designates a drive, and it is provided with a loading mechanism 62 that holds the tray, sets the medium on the turn table 33, and clamps the medium. Two drives 61 are loaded.

A description is given of the operation. Similar to the first embodiment described with respect to FIG. 1, the tray carrier unit 60, which has taken and stored the tray, moves in the a direction and inserts the tray in the loading mechanism 62 of the specified drive 61. The loading mechanism 62 clamps the medium on the turn table 33, and judges the kind of the medium by the first switch 37. The drive 61 operates adapting to the respective media. When the medium is a recordable and reproducible medium, the 'enable' or 'disable' of recording/deletion is detected by the second switch 38. When 'enable' is detected, recording/reproduction or deletion is performed. When 'disable' is detected, for example, an error message is sent to the host, and the tray is returned to its magazine 21. In the auto-changer of this system, it is possible to selectively insert the media in the respective drives.

As described above, according to the present invention, trays for two kinds of media can be mixed in a single magazine and individually locked in the magazine and, especially, the tray for a recordable and reproducible medium, which must be treated carefully, has such a structure that the user cannot release the lock easily, thereby providing an auto-changer that can mount two kinds of media in a single magazine and is adapted to multimedia age. Especially, the structure according to the invention is very effective for a small-sized auto-changer that can mount only one magazine. Further, since the tray for a recordable and reproducible medium is provided with means for arbitrarily setting 'enable' or 'disable' for recording/deletion, a complicated work, such as enable/disable management for recording/deletion of a medium by a software, is dispensed with. Further, in the structure where this tray is constituted by a magazine, the user can perform enable/disable setting for recording/deletion of a medium from the outside of the magazine, without taking the tray from the magazine.

What is claimed is:

1. A medium automatic interchange apparatus comprising;

a recording and reproducing apparatus capable of mounting (i) reproduction-only media and (ii) recordable and reproducible media and processing said (i) reproduction-only media and (ii) recordable and reproducible media;

media trays being attachable to said recording and reproducing apparatus, mounting said reproduction-only media and recordable and reproducible media, and having means for discriminating said (i) reproduction-only media and (ii) recordable and reproducible media;

a magazine capable of storing a mixture of plural first media trays mounting the reproduction-only media and plural second media trays mounting the recordable and reproducible media, and having means for individually locking in place the first and second media trays, the means for locking comprising mechanisms respectively corresponding to the first media trays for reproduction-only media and the second media trays for recordable and reproducible media;

release means for releasing the first and second media trays locked by the magazine; and tray carrier means for taking or inserting the first and second media trays stored in the magazine and carrying the first and second media trays to the recording and reproducing apparatus.

2. The medium automatic interchange apparatus described in claim 1, wherein the release means corresponds to the individual mechanisms of the locking means.

* * * * *